United States Patent [19]

Mechanic et al.

[11] Patent Number: 5,775,559

[45] Date of Patent: Jul. 7, 1998

[54] BICYCLE BASKET ASSEMBLY

[76] Inventors: Joseph M. Mechanic; Victoria Mechanic, both of 4987 Oldham St., Sarasota, Fla. 34238

[21] Appl. No.: 869,673

[22] Filed: Jun. 5, 1997

[51] Int. Cl.$^6$ .................................................... B62J 7/00
[52] U.S. Cl. .......................... 224/434; 224/435; 224/421; 224/919
[58] Field of Search ............................. 224/919, 412, 224/413, 419, 420, 421, 424, 425, 426, 428, 433, 434, 435, 438, 441, 439, 442, 447, 450, 463; D12/400, 406, 407, 409, 410, 411; D3/254, 257, 258; 206/315.1, 315.9, 315.91; 220/485, 491, 4.24, 4.25, 4.21, 4.22, 668

[56] References Cited

U.S. PATENT DOCUMENTS

| 672,495 | 4/1901 | Smith | 224/434 |
|---|---|---|---|
| 1,359,329 | 11/1920 | Carson | 224/421 |
| 1,861,948 | 6/1932 | Barkdoll | D3/257 |
| 2,010,479 | 8/1935 | Dennis | 224/421 |
| 2,287,531 | 6/1942 | Ong | 224/485 |
| 3,195,540 | 8/1965 | Averett | 220/4.25 |
| 3,945,568 | 3/1976 | Bychowski | 220/4.25 |
| 4,063,637 | 12/1977 | Danforth | 224/434 |
| 4,598,846 | 7/1986 | Schroeder . | |
| 4,779,794 | 10/1988 | Moore | 224/4.25 |
| 5,197,640 | 3/1993 | Hurley et al. . | |
| 5,353,973 | 10/1994 | McMurtrey . | |
| 5,407,111 | 4/1995 | Lanouette et al. | 224/151 |

Primary Examiner—Henry J. Recla
Assistant Examiner—Gregory M. Vidovich
Attorney, Agent, or Firm—Joseph N. Breaux

[57] ABSTRACT

A bicycle basket assembly that includes a two-part, spherically-shaped clamshell cage assembly; an upper cage mounting bracket; and a lower cage mounting bracket; the clamshell cage assembly including a lower hemisphere cage section that is hingedly attached to an upper hemisphere cage section; the lower hemisphere cage section including a lower circular opening, a circular-shaped lower rim portion and a lower locking hasp member; the upper hemisphere cage section including an upper circular opening, a circular-shaped upper rim portion and an upper locking hasp member; the upper cage mounting bracket having a first upper bracket end and a second upper bracket end, the first upper bracket end extending from a portion of the circular-shaped lower rim portion of the lower hemisphere cage section, the second upper bracket end having a goose neck insertion passageway formed therethrough that is sized to receive therethrough the goose neck portion of a bicycle handlebar support; the lower cage mounting bracket including a first lower bracket end and a second lower bracket end, the first lower bracket end extending from the exterior center of the lower hemisphere cage section, the second lower bracket end having a two-section hook and pile attachment strap assembly provided thereon for securing the second lower bracket end to a section of a bicycle frame.

16 Claims, 2 Drawing Sheets

BICYCLE BASKET ASSEMBLY

TECHNICAL FIELD

The present invention relates to basket assemblies for transporting items and more particularly to a basket assembly for transporting sports equipment that includes a two-part, spherically-shaped clamshell cage assembly; an upper cage mounting bracket; and a lower cage mounting bracket; the clamshell cage assembly including a lower hemisphere cage section that is hingedly attached to an upper hemisphere cage -section; the lower hemisphere cage section including a lower circular opening, a circular-shaped lower rim portion and a lower locking hasp member; the upper hemisphere cage section including an upper circular opening, a circular-shaped upper rim portion and an upper locking hasp member; the upper cage mounting bracket having a first upper bracket end and a second upper bracket end, the first upper bracket end extending from a portion of the circular-shaped lower rim portion of the lower hemisphere cage section, the second upper bracket end having a goose neck insertion passageway formed therethrough that is sized to receive therethrough the goose neck portion of a bicycle handlebar support; the lower cage mounting bracket including a first lower bracket end and a second lower bracket end, the first lower bracket end extending from the exterior center of the lower hemisphere cage section, the second lower bracket end having a two-section hook and pile attachment strap assembly provided thereon for securing the second lower bracket end to a section of a bicycle frame.

BACKGROUND OF THE INVENTION

Each year many children are injured while attempting to transport sporting equipment, such as baseball bats, baseball gloves, baseballs, basketballs, and footballs, to and from the site of an athletic contest while riding a bicycle or the like. Although the above described athletic equipment is easily transported in a car or other four wheeled vehicle, this type of athletic equipment can be ungainly and prone to falling or bouncing out of conventional open topped bicycle baskets. It would be a benefit, therefore, to have a basket assembly for a bicycle that included a closable cage that is sized to contain at least a basketball sized object therein. Because children often leave their bicycles unattended for periods of time, it would be a further benefit if the closeable cage could be locked in a closed configuration to reduce the chance of theft of the athletic equipment. In addition, because baseball bats are particularly difficult to transport safely while riding a bicycle, it would be a further benefit to have a basket assembly for a bicycle that included a baseball bat holding mechanism for holding a baseball bat securely for transport.

SUMMARY OF THE INVENTION

It is thus an object of the invention to provide a bicycle basket assembly.

It is a further object of the invention to provide a bicycle basket assembly that includes a closable cage that is sized to contain at least a basketball sized object therein.

It is a still further object of the invention to provide a bicycle basket assembly that includes a closeable cage that is lockable in a closed configuration.

It is a still further object of the invention to provide a bicycle basket assembly that includes a baseball bat holding mechanism for holding a baseball bat securely for transport.

It is a still further object of the invention to provide a bicycle basket assembly that includes a two-part, spherically-shaped clamshell cage assembly; an upper cage mounting bracket; and a lower cage mounting bracket; the clamshell cage assembly including a lower hemisphere cage section that is hingedly attached to an upper hemisphere cage section; the lower hemisphere cage section including a lower circular opening, a circular-shaped lower rim portion and a lower locking hasp member; the upper hemisphere cage section including an upper circular opening, a circular-shaped upper rim portion and an upper locking hasp member; the upper cage mounting bracket having a first upper bracket end and a second upper bracket end, the first upper bracket end extending from a portion of the circular-shaped lower rim portion of the lower hemisphere cage section, the second upper bracket end having a goose neck insertion passageway formed therethrough that is sized to receive therethrough the goose neck portion of a bicycle handlebar support; the lower cage mounting bracket including a first lower bracket end and a second lower bracket end, the first lower bracket end extending from the exterior center of the lower hemisphere cage section, the second lower bracket end having a two-section hook and pile attachment strap assembly provided thereon for securing the second lower bracket end to a section of a bicycle frame.

It is a still further object of the invention to provide a bicycle basket assembly that accomplishes some or all of the above objects in combination.

Accordingly, a bicycle basket assembly is provided. The bicycle basket assembly includes a two-part, spherically-shaped cage assembly; an upper cage mounting bracket; and a lower cage mounting bracket; the clamshell cage assembly including a lower hemisphere cage section that is hingedly attached to an upper hemisphere cage section; the lower hemisphere cage section including a lower circular opening, a circular-shaped lower rim portion and a lower locking hasp member; the upper hemisphere cage section including an upper circular opening, a circular-shaped upper rim portion and an upper locking hasp member; the upper cage mounting bracket having a first upper bracket end and a second upper bracket end, the first upper bracket end extending from a portion of the circular-shaped lower rim portion of the lower hemisphere cage section, the second upper bracket end having a goose neck insertion passageway formed therethrough that is sized to receive therethrough the goose neck portion of a bicycle handlebar support; the lower cage mounting bracket including a first lower bracket end and a second lower bracket end, the first lower bracket end extending from the exterior center of the lower hemisphere cage section, the second lower bracket end having a two-section hook and pile attachment strap assembly provided thereon for securing the second lower bracket end to a section of a bicycle frame. In a preferred embodiment, the two-part, spherically-shaped clamshell cage assembly is sized to receive and hold a full size basketball. In another preferred embodiment, the bicycle basket assembly further includes a lower circular opening sealing plug that is sized to fit into and seal the lower circular opening of the lower hemisphere cage section .

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
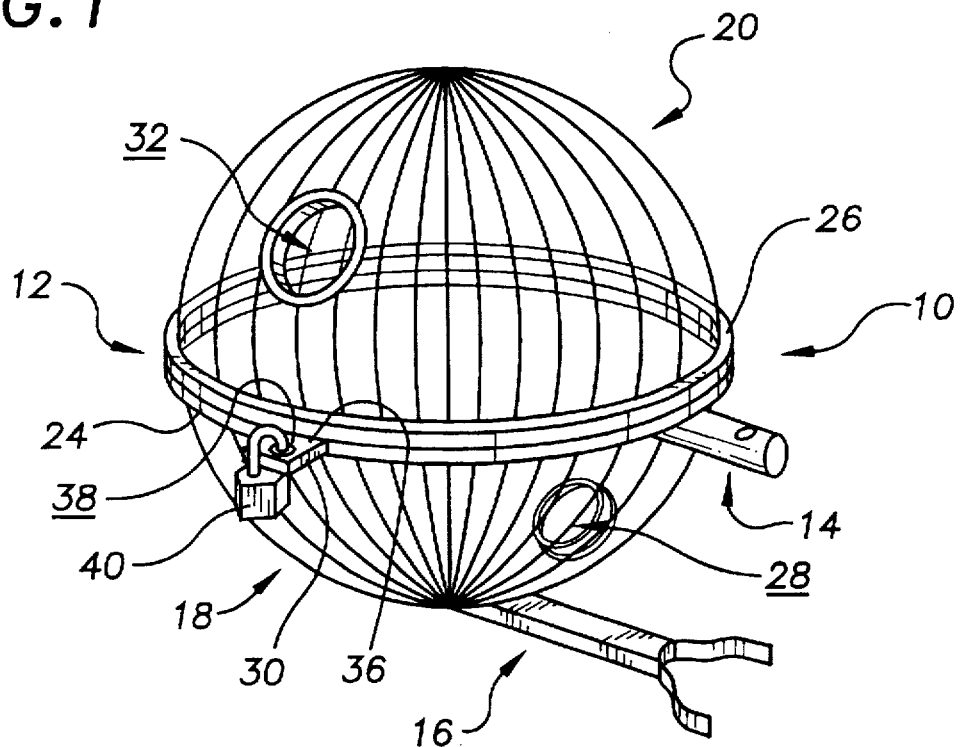
FIG. 1 is a perspective view of an exemplary embodiment of the bicycle basket assembly of the present invention showing the spherically-shaped clamshell cage assembly including the lower hemisphere cage section with the lower circular opening and the lower hasp member and the upper hemisphere cage section with the upper circular opening and the upper hasp member; the upper cage mounting bracket extending from the rim portion of the lower hemisphere cage section at the first upper bracket end thereof and the goose neck insertion passageway formed through the second upper bracket end thereof that is sized to fit over the goose neck portion of a bicycle handlebar support; and the lower cage mounting bracket extending from the exterior center of the lower hemisphere cage section at the first lower bracket end thereof and the two cage section hook and pile attachment strap assembly that is provided at the second lower bracket end.

FIG. 1 shows an exemplary embodiment of the bicycle basket assembly of the present invention generally designated by the numeral 10. Basket assembly 10 includes a two-part, spherically-shaped clamshell cage assembly, generally designated 12; an upper cage mounting bracket, generally designated 14; and a lower cage mounting bracket 16.

Figure 2:
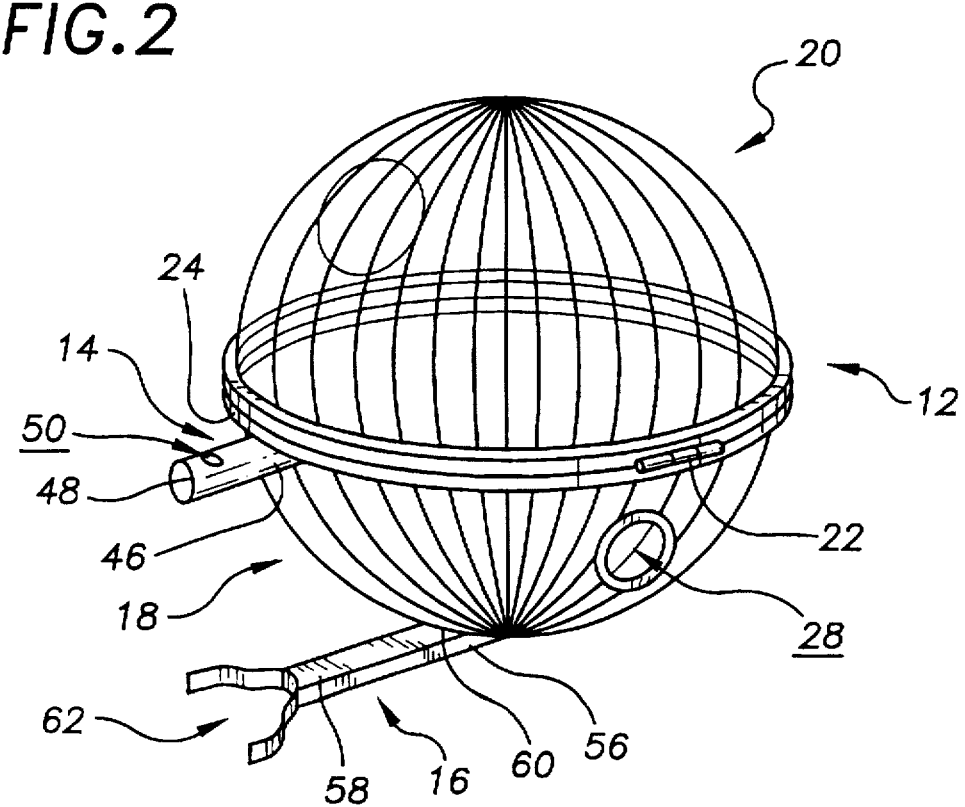
FIG. 2 is a second perspective view of the exemplary bicycle basket assembly of FIG. 1 showing the hinge assembly connected between the upper hemisphere cage section and the lower hemisphere cage section.
Figure 3:
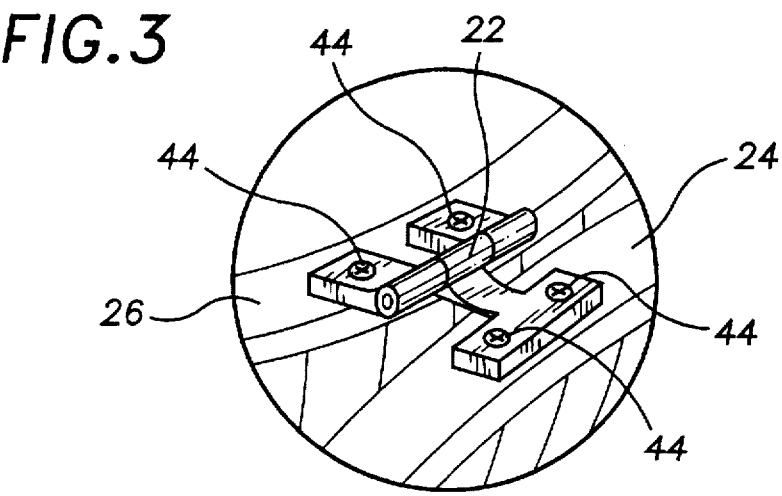
FIG. 3 is a detail perspective view of the hinge assembly connected between the rim portion of the upper hemisphere cage section and the rim portion of the lower hemisphere cage section.

Clamshell cage assembly 12 includes a lower hemisphere cage section, generally designated 18, that is hingedly attached to an upper hemisphere cage section, generally designated 20, by a hinge 22 (FIGS. 2 and 3). In this embodiment, lower and upper hemisphere cage sections 18,20 are each partially constructed from chrome-plated, steel wire mesh that has been formed into a hemispherical bowl shape that is rimmed, respectively by a circular shaped, steel lower and upper rim portion 24,26.

Lower hemisphere cage section 18 includes a lower circular opening 28 (also shown in FIG. 2) that has a diameter greater than the knob end of a baseball bat and a lower locking hasp member 30 that extends outwardly from lower rim portion 24. Upper hemisphere cage section 20 includes an upper circular opening 32 having a diameter equal to the diameter of the hitting area section 33 (between dashed lines in FIG. 4) of a baseball bat and an upper locking hasp member 36 that extends outwardly from upper rim portion 26. When lower and upper hemisphere cage sections 18,20 are pivoted into the closed configuration, lower and upper rim portions 24,26 are in registration and the lock apertures 38 of each of the lower and upper locking hasp members 30,36 are in registration allowing lower and upper hemisphere cage sections 18,20 to be locked in the closed configuration with a conventional padlock 40.

With reference to FIG. 2, when not locked in the closed configuration, lower and upper hemisphere cage sections 18,20 can be pivoted at hinge 22 to allow a basketball or other sports equipment to be placed within spherical cage assembly 12. Referring to FIG. 3, in this embodiment hinge 22 is secured between lower rim portion 24 and upper rim portion 26 with sheet metal screws 44.

Referring back to FIG. 2, upper cage mounting bracket 14 is constructed of cast metal and includes a first upper bracket end 46 and a second upper bracket end 48. First upper bracket end 46 is attached to lower rim portion 24 of lower hemisphere cage section 18. A cylindrically shaped goose neck insertion passageway 50 is formed through second upper bracket end 48. Goose neck insertion passageway 50 is sized to receive therethrough the goose neck portion 54 (FIG. 4) of a bicycle handlebar support.

Lower cage mounting bracket 16 is constructed of cast metal and includes a first lower bracket end 56 and a second lower bracket end 58. First lower bracket end 56 is secured to the exterior center 60 of lower hemisphere cage section 18. Lower cage mounting bracket 16 extends tangentially away from the exterior center 60 of lower hemisphere cage section 18 and is oriented in parallel with upper cage mounting bracket 14. A two-section hook and pile attachment strap assembly 62 is secured to second lower bracket end 58. Strap assembly 62 is provided for securing second lower bracket end 58 to a section 64 (FIG. 4) of a bicycle frame 66 (FIG. 4).

Figure 4:
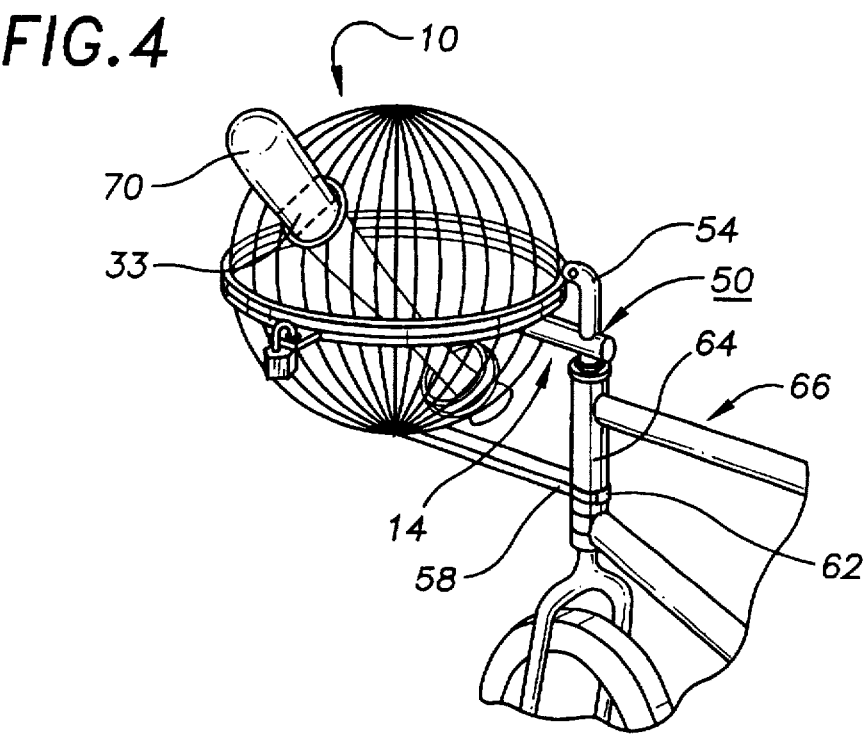
FIG. 4 is a perspective view of the bicycle basket assembly of FIGS. 1 and 2 mounted to the forward end of a representative bicycle with the spherically-shaped clamshell cage assembly mounted to the bicycle by positioning the goose neck insertion passageway of the upper cage mounting bracket over the goose neck portion of the bicycle handlebar support and securing the two cage section hook and pile attachment strap assembly of the lower cage mounting bracket about fork bearing tube of the bicycle; and a representative baseball bat with the grip end inserted through the upper circular opening of the upper hemisphere cage section and through the lower circular opening of the lower hemisphere cage section.
Figure 4A:
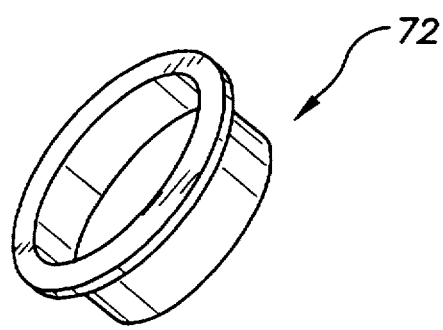
FIG. 4A is a perspective view of an exemplary lower circular opening sealing plug that is used to seal the lower circular opening of the lower hemisphere cage section when carrying small items.

With reference now to FIG. 4, basket assembly 10 is mounted to a bicycle frame 66 by removing the handlebar (not shown) from the goose neck portion 54 of a bicycle handlebar support; inserting goose neck portion 54 through goose neck insertion passageway 50 of upper cage mounting bracket 14; positioning second lower bracket end 58 against section 64 of bicycle frame 66; and securing two-section hook and pile attachment strap assembly 62 about section 64 of bicycle frame 66. Basket assembly 10 is then used as previously described. If no baseball bat 70 is to be transported, referring to FIG. 4A, a lower circular opening sealing plug 72 is provided for inserting into and plugging lower circular opening 28 (FIG. 2) to allow for convenient carrying of small items within lower hemisphere cage section 18.

It can be seen from the preceding description that a bicycle basket assembly that includes a closable cage that is sized to contain at least a basketball sized object therein; that includes a closeable cage that is lockable in a closed configuration; that includes a baseball bat holding mechanism for holding a baseball bat securely for transport; and that includes a two-part, spherically-shaped clamshell cage assembly; an upper cage mounting bracket; and a lower cage mounting bracket; the clamshell cage assembly including a lower hemisphere cage section that is hingedly attached to an upper hemisphere cage section; the lower hemisphere cage section including a lower circular opening, a circular-shaped lower rim portion and a lower locking hasp member; the upper hemisphere cage section including an upper circular opening, a circular-shaped upper rim portion and an upper locking hasp member; the upper cage mounting bracket having a first upper bracket end and a second upper bracket end, the first upper bracket end extending from a portion of the circular-shaped lower rim portion of the lower hemisphere cage section, the second upper bracket end having a goose neck insertion passageway formed therethrough that is sized to receive therethrough the goose neck portion of a bicycle handlebar support; the lower cage mounting bracket including a first lower bracket end and a second lower bracket end, the first lower bracket end extending from the exterior center of the lower hemisphere cage section, the second lower bracket end having a two-section hook and pile attachment strap assembly provided thereon for securing the second lower bracket end to a section of a bicycle frame.

It is noted that the embodiment of the bicycle basket assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A bicycle basket assembly comprising:
a two-part, spherically-shaped clamshell cage assembly; said clamshell cage assembly including a lower hemisphere cage section that is hingedly attached to an upper hemisphere cage section; said lower hemisphere cage section including a lower circular opening, a circular-shaped lower rim portion and a lower locking hasp member; said upper hemisphere cage section including an upper circular opening, a circular-shaped upper rim portion and an upper locking hasp member;
an upper cage mounting bracket secured to said lower hemisphere cage portion; and
a lower cage mounting bracket secured to said lower hemisphere cage portion wherein each said bracket being configured to suspend said cage assembly from a bicycle.

2. The bicycle basket assembly of claim 1 wherein: said two-part, spherically-shaped clamshell cage assembly is sized to receive and hold a full size basketball.

3. The bicycle basket assembly of claim 1 further including:
a lower circular opening sealing plug that is sized to fit into and seal said lower circular opening of said lower hemisphere cage section.

4. The bicycle basket assembly of claim 1, wherein: said upper cage mounting bracket includes a first upper bracket end and a second upper bracket end, said first upper bracket end extending from a portion of said circular-shaped lower rim portion of said lower hemisphere cage section, said second upper bracket end having a goose neck insertion passageway formed therethrough that is sized to receive therethrough a goose neck portion of a bicycle handlebar support.

5. The bicycle basket assembly of claim 1, wherein: said lower cage mounting bracket includes a first lower bracket end and a second lower bracket end, said first lower bracket end extending from an exterior center of said lower hemisphere cage section, said second lower bracket end having a two-section hook and pile attachment strap assembly provided thereon for securing said second lower bracket end to a section of a bicycle frame.

6. The bicycle basket assembly of claim 2 further including:
a lower circular opening sealing plug that is sized to fit into and seal said lower circular opening of said lower hemisphere cage section.

7. The bicycle basket assembly of claim 2, wherein: said upper cage mounting bracket includes a first upper bracket end and a second upper bracket end, said first upper bracket end extending from a portion of said circular-shaped lower rim portion of said lower hemisphere cage section, said second upper bracket end having a goose neck insertion passageway formed therethrough that is sized to receive therethrough a goose neck portion of a bicycle handlebar support.

8. The bicycle basket assembly of claim 2, wherein: said lower cage mounting bracket includes a first lower bracket end and a second lower bracket end, said first lower bracket end extending from an exterior center of said lower hemisphere cage section, said second lower bracket end having a two-section hook and pile attachment strap assembly provided thereon for securing said second lower bracket end to a section of a bicycle frame.

9. The bicycle basket assembly of claim 6, wherein: said upper cage mounting bracket includes a first upper bracket end and a second upper bracket end, said first upper bracket end extending from a portion of said circular-shaped lower rim portion of said lower hemisphere cage section, said second upper bracket end having a goose neck insertion passageway formed therethrough that is sized to receive therethrough a goose neck portion of a bicycle handlebar support.

10. The bicycle basket assembly of claim 6, wherein: said lower cage mounting bracket includes a first lower bracket end and a second lower bracket end, said first lower bracket end extending from said exterior center of said lower hemisphere cage section, said second lower bracket end having a two-section hook and pile attachment strap assembly provided thereon for securing said second lower bracket end to a section of a bicycle frame.

11. The bicycle basket assembly of claim 7, wherein: said lower cage mounting bracket includes a first lower bracket end and a second lower bracket end, said first lower bracket end extending from an exterior center of said lower hemisphere cage section, said second lower bracket end having a two-section hook and pile attachment strap assembly provided thereon for securing said second lower bracket end to a section of a bicycle frame.

12. The bicycle basket assembly of claim 3, wherein: said upper cage mounting bracket includes a first upper bracket end and a second upper bracket end, said first upper bracket end extending from a portion of said circular-shaped lower rim portion of said lower hemisphere cage section, said second upper bracket end having a goose neck insertion passageway formed therethrough that is sized to receive therethrough a goose neck portion of a bicycle handlebar support.

13. The bicycle basket assembly of claim 3, wherein: said lower cage mounting bracket includes a first lower bracket end and a second lower bracket end, said first lower bracket end extending from an exterior center of said lower hemisphere cage section, said second lower bracket end having a two-section hook and pile attachment strap assembly provided thereon for securing said second lower bracket end to a section of a bicycle frame.

14. The bicycle basket assembly of claim 12, wherein:

said lower cage mounting bracket includes a first lower bracket end and a second lower bracket end, said first lower bracket end extending from said exterior center of said lower hemisphere cage section, said second lower bracket end having a two-section hook and pile attachment strap assembly provided thereon for securing said second lower bracket end to a section of a bicycle frame.

15. The bicycle basket assembly of claim 4, wherein:

said lower cage mounting bracket includes a first lower bracket end and a second lower bracket end, said first lower bracket end extending from said exterior center of said lower hemisphere cage section, said second lower bracket end having a two-section hook and pile attachment strap assembly provided thereon for securing said second lower bracket end to a section of a bicycle frame.

16. A bicycle basket assembly comprising:

a two-part, spherically-shaped clamshell cage assembly; said clamshell cage assembly including a lower hemisphere cage section that is hingedly attached to an upper hemisphere cage section; said lower hemisphere cage section including a lower circular opening, a circular-shaped lower rim portion and a lower locking hasp member; said upper hemisphere cage section including an upper circular opening, a circular-shaped upper rim portion and an upper locking hasp member;

an upper cage mounting bracket secured to said lower hemisphere cage portion;

a lower cage mounting bracket secured to said lower hemisphere cage portion; and a lower circular opening sealing plug that is sized to fit into and seal said lower circular opening of said lower hemisphere cage section;

said two-part, spherically-shaped clamshell cage assembly being sized to receive and hold a full size basketball and including lengths of steel wire;

said upper cage mounting bracket including a first upper bracket end and a second upper bracket end, said first upper bracket end extending from a portion of said circular-shaped lower rim portion of said lower hemisphere cage section, said second upper bracket end having a goose neck insertion passageway formed therethrough that is sized to receive therethrough a goose neck portion of a bicycle handlebar support;

said lower cage mounting bracket including a first lower bracket end and a second lower bracket end, said first lower bracket end extending from an exterior center of said lower hemisphere cage section, said second lower bracket end having a two-section hook and pile attachment strap assembly provided thereon for securing said second lower bracket end to a section of a bicycle frame.

* * * * *